United States Patent [19]
Coleman et al.

[11] 3,737,019
[45] June 5, 1973

[54] CONVEYOR SYSTEM
[75] Inventors: Marvin H. Coleman, Winnetka; Walter A. Leibfritz, Niles, both of Ill.
[73] Assignee: Conveyor Systems, Inc., Morton Grove, Ill.
[22] Filed: Sept. 15, 1971
[21] Appl. No.: 180,626

[52] U.S. Cl. .....................198/21, 198/34, 198/127
[51] Int. Cl. ........................B65g 47/42, B65g 47/26
[58] Field of Search.......................198/21, 110, 127, 198/34

[56] References Cited
UNITED STATES PATENTS

| 3,108,677 | 10/1963 | Temple | 198/21 |
| 3,621,971 | 11/1971 | Daniels et al. | 198/21 |
| 3,239,054 | 3/1966 | Eliassen | 198/21 |

*Primary Examiner*—Harvey C. Hornsby
*Assistant Examiner*—James W. Miller
*Attorney*—Wallenstein, Spangenberg, Hattis & Strampel

[57] ABSTRACT

A conveyor system for transferring an article from one continuously driven conveyor to another continuously driven conveyor which is positioned at an abrupt angle with relation to the first driven conveyor while properly maintaining a given article orientation. The system in its preferred form comprises a first continuously driven conveyor for moving an article along a given path of travel to a discharge station. A second continuously driven conveyor, having an inlet station positioned at the discharge station of the first conveyor, is provided to move the article along a second given path of travel which is at substantially a right angle to the path of travel of the article along the first conveyor. Vertically movable article support means is provided at the inlet station of the second conveyor which, in a raised condition, receives an article propelled thereon from the discharge station of the first conveyor, and supports the article above the inlet station of the second conveyor until the article comes to rest. Lowering of the article support means transfers the article to the second conveyor. Article accelerating means advantageously is positioned at the discharge station of the first conveyor for propelling the article onto the article support means. In addition, article abutment means is provided adjacent to the article support means for engaging a side of the article to assure a given article orientation prior to moving the article along the second conveyor.

5 Claims, 5 Drawing Figures

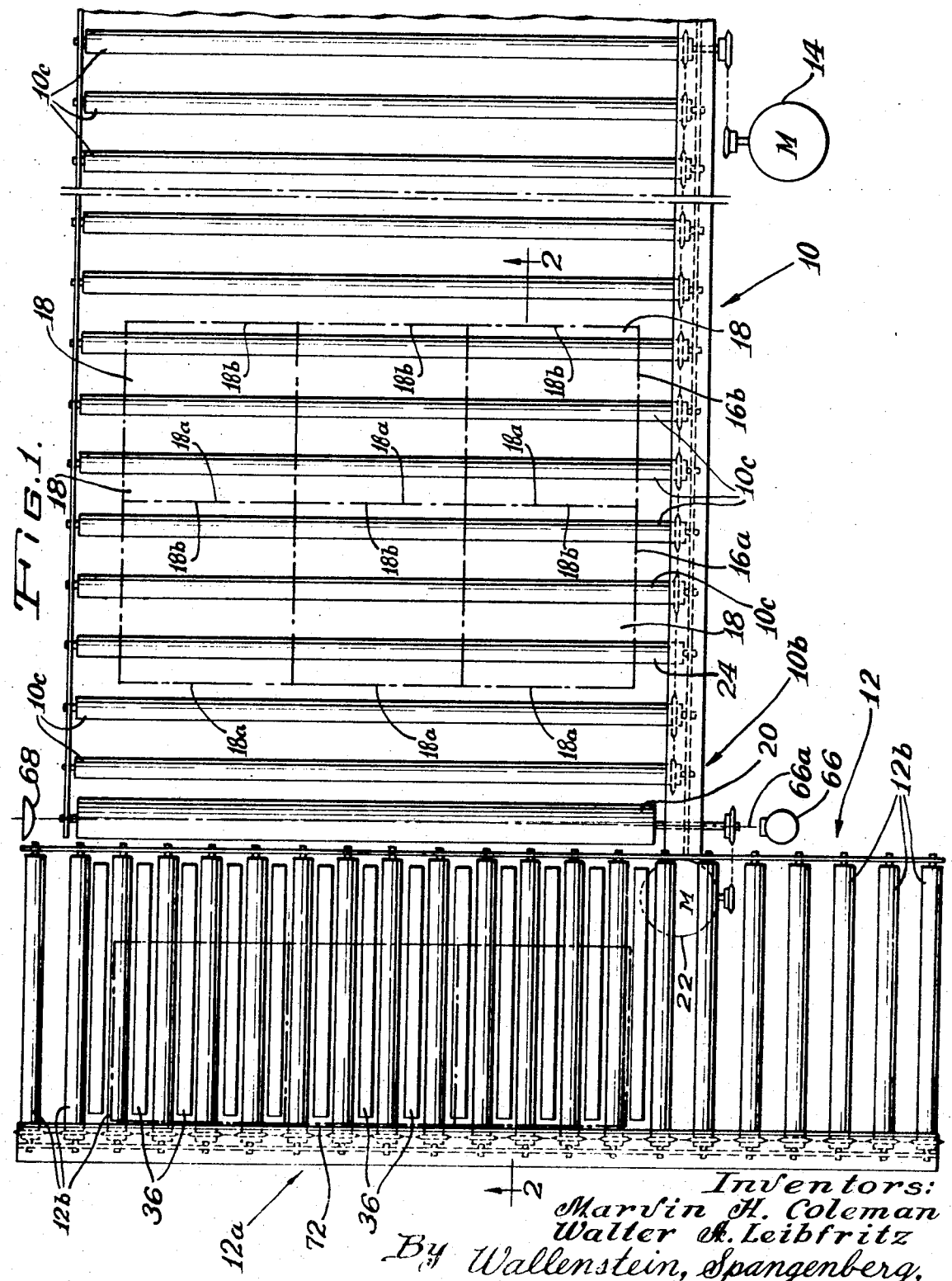

Patented June 5, 1973
3,737,019
3 Sheets-Sheet 2
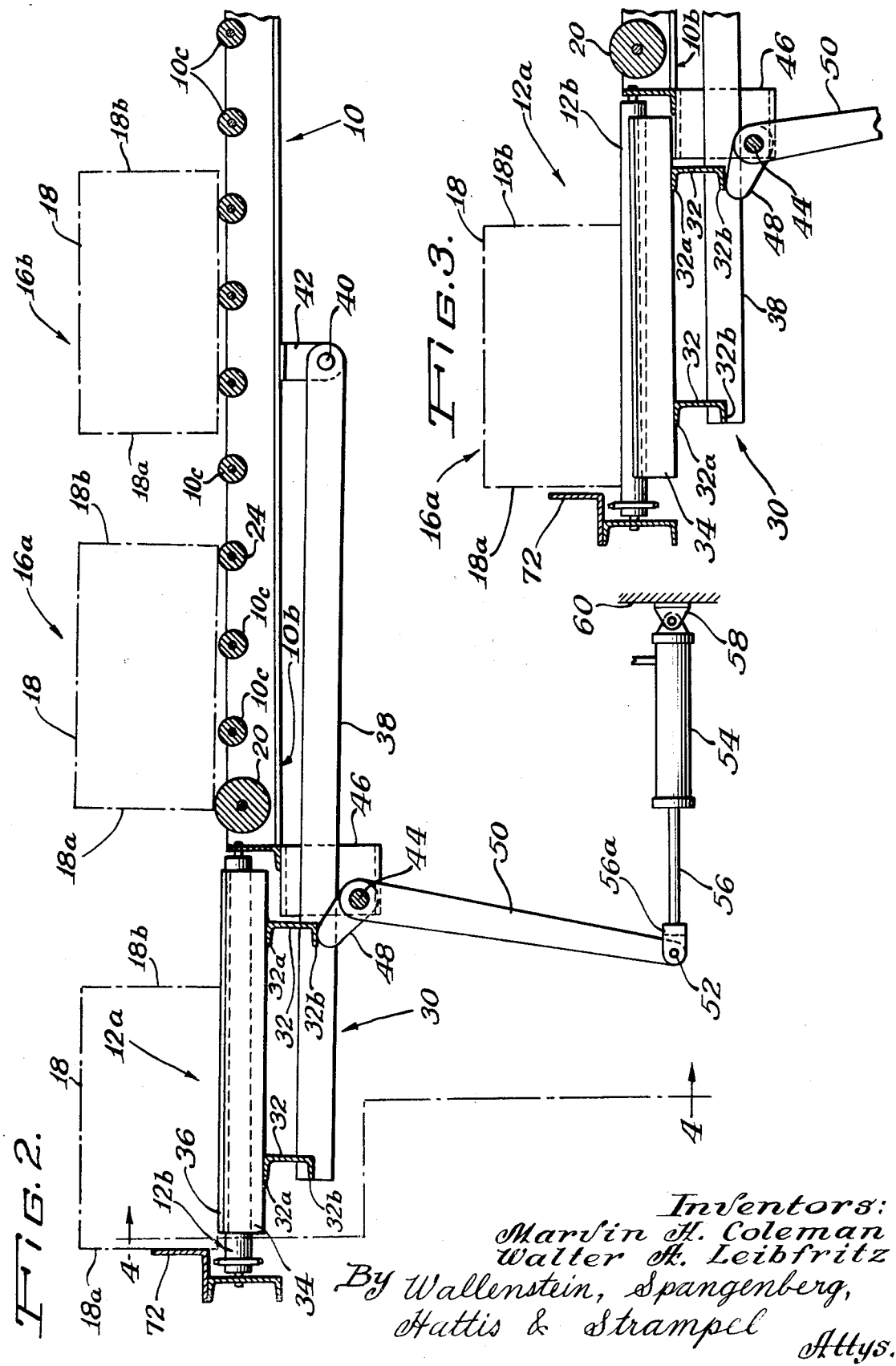

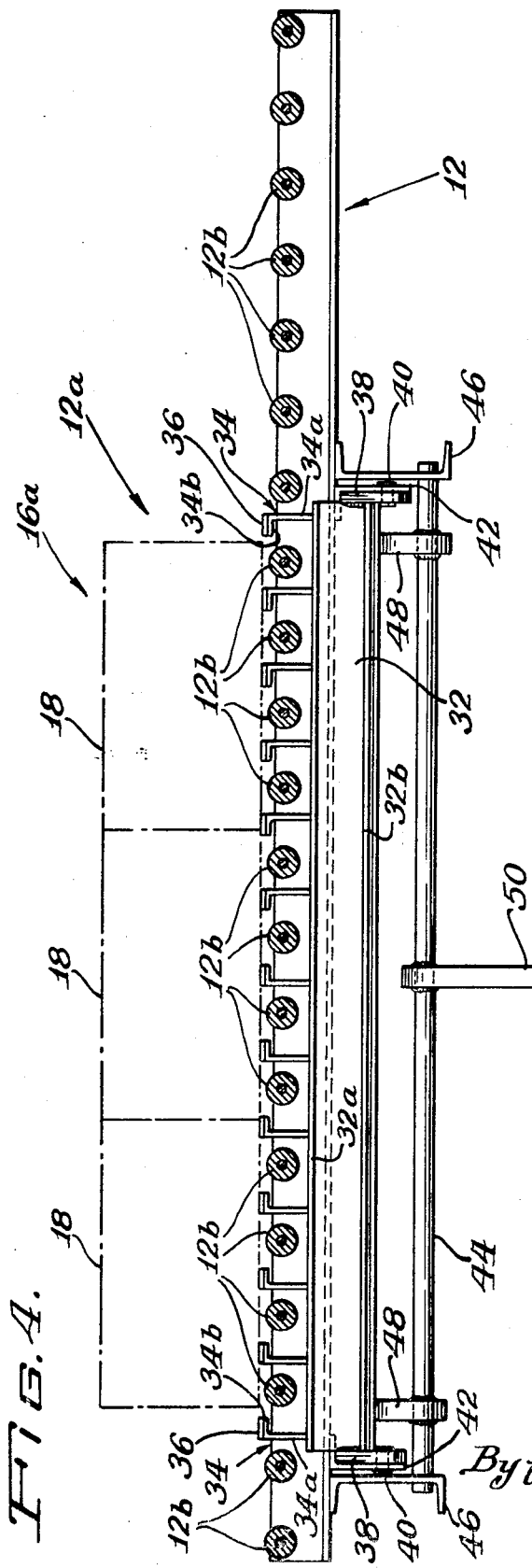

CONVEYOR SYSTEM

The present invention relates to a conveyor system for abruptly changing the direction of travel of an article along one continuously driven conveyor to another continuously driven conveyor while maintaining a given article orientation.

Conveyor systems, wherein articles such as boxes or cartons are moved along paths which vary abruptly in direction, are in widespread use. In many cases, such abrupt change in direction must be achieved without any change in the orientation of the articles which will cause the sides of the articles to be out of alignment with the direction of travel thereof. The maintenance of a given article orientation is of importance to maximize article handling capacity, to keep groups of articles together, to avoid jamming problems, and/or to present coded characters on the sides of the articles, which determine the discharge location thereof, in parallel relation to code readers placed along one side of the conveyor adjacent each possible article discharge station.

It has been customary where one conveyor moving in one direction discharges articles upon a second conveyor moving at right angles thereto to provide a wall at the inlet end of the second conveyor against which the articles discharged upon the second conveyor are impelled to keep the articles moved onto the second conveyor from falling off the side of the second conveyor and to keep the articles properly oriented. It should be appreciated that when articles moved onto the second conveyor in one direction engage the second conveyor moving at right angles thereto a force is imparted to the articles tending to twist the articles at an angle to the direction of movement of both conveyors. The wall at the side of the second conveyor against which the articles are impelled frequently does not restore the proper alignment or orientation of the articles when the degree of twisting of the articles is appreciable. The twisting problem becomes even further aggravated when the articles are delivered upon the first conveyor with successive articles in front-to-back contact, and a separator roller is used to separate the articles just before the articles are moved onto the second conveyor. In such case, the separator roller is moving at a higher peripheral speed than the rollers of the first conveyor and an article slightly askew simultaneously engaged by the separator roller and the slower driven conveyor rollers is subjected to drag forces which impart added twisting forces to the articles. Also, in such case, the second conveyor must be speeded up to remove and article first delivered to the second conveyor from the path of the article immediately behind the just separated article. The speeded up second conveyor, however, magnifies the twisting forces involved.

In the present invention, a conveyor system is provided which simply, efficiently and effectively reduces or eliminates the twisting forces imparted to articles during the transfer thereof from a feed conveyor moving in one direction to a second conveyor moving at a substantial angle to the first conveyor, and most preferably also when a separator roller is used to separate articles as they are moved upon the second conveyor.

To this end, where the first and second conveyors are driven roller conveyors, vertically movable article support means are provided at the inlet of the second conveyor comprising a plurality of article support members (such as elongated, narrow, rectangular bars or the like) mounted for simultaneous movement from a lowered position below the upper level of the driven rollers of the second conveyor at the inlet station thereof upward between the rollers of the second conveyor to a raised position above the upper level of the rollers of said conveyor. In their raised position, the article support members receive an article propelled from the discharge station of the first conveyor, and support the article until it comes to rest, after which they are lowered to drop the article or articles involved upon the driven rollers of the second conveyor. In such case, the articles are not simultaneously subjected to horizontal forces extending in two different directions which produce the first described twisting forces.

The raising and lowering of the article support members may be controlled by providing a light source or other articles position sensing means on one side of the first conveyor at the discharge station thereof. The light source projects a beam of light across the discharge station which, when interrupted by an article, generates a control signal for actuating means connected to the article support members.

Where the articles on the first conveyor are in front-to-back contact and are to be separated by a high-speed separator roller positioned at the discharge station of the first conveyor, to minimize the twisting forces on the articles contacting the separator roller (which is generally at a slightly higher elevation than the rollers of the associated conveyor), the roller of the latter conveyor on which the trailing end of the article rides as the front end of the article engages the slightly raised separator roller is an undriven idler roller so the article is not simultaneously contacted by two rollers operating at different peripheral speeds.

The above and other features and advantages of this invention will become apparent from the description to follow, taken in conjunction with the accompanying drawings wherein like reference numerals throughout the various views are intended to designate similar elements or components.

FIG. 1 is a top plan view of a conveyor system incorporating features of the present invention;

FIG. 2 is a vertical sectional view taken substantially along line 2—2 of FIG. 1 showing the article support members of the system in a raised position;

FIG. 3 is an enlarged, fragmentary sectional view corresponding to FIG. 2 showing the article support members in a lowered position;

FIG. 4 is a vertical sectional view taken substantially along line 4—4 of FIG. 2; and FIG. 5 is a simplified diagram of the control circuitry for actuating the mechanism for raising and lowering the article support members of the embodiment of the system illustrated.

Referring, now, to FIG. 1, the embodiment of the invention illustrated comprises a first infeeding roller conveyor 10 having an article discharge station 10b, and a second outfeeding roller conveyor 12, positioned at approximately a right angle to the conveyor 10, having an inlet station 12a located adjacent to the discharge station 10b of the conveyor 10.

The first conveyor 10 has a plurality of longitudinally spaced rollers 10c which are driven in the direction of the inlet station 12a of the second conveyor 12 by a motor 14. In the conveyor system illustrated, rows 16a and 16b of articles 18 in the form of packed cartons or boxes in front-to-back contact are delivered to the first conveyor 10. These rows 16a and 16b of articles are to be separated from one another as they are delivered to the second conveyor 12. To this end, the discharge station 10b of the conveyor 10 has an article speed-up separator roller 20 which is positioned at a higher elevation than the rollers 10c and is driven by a motor 22 at a speed substantially greater than are the rollers 10c so that each row of articles reaching the same (or each individual article where individual rather than rows of articles are being conveyed) is separated from the one behind the same. The first conveyor 10 further includes an idler roller 24 which is positioned in spaced relation to the elevated separator roller 20 at a distance such that when the leading end or side 18a of the articles 18 (see FIG. 2) makes contact with the roller 20, the trailing end or side 18b of the article 18 will be in contact with the idler roller 24 of the conveyor 10 and will be raised by the elevated separator roller 20 above the intervening driven rollers 10c. The high speed separator roller 20 will then swiftly impel the articles from the first conveyor before they touch any of the driven rollers 10c. Thus, any drag on the articles 18 which may otherwise result from any action on the articles by the slower driven rollers 10c in relation to the high-speed driven roller 20 which can create article twisting forces is eliminated.

The second outfeeding conveyor 12, like the conveyor 10, has a plurality of spaced, driven rollers 12b oriented at right angles to the rollers 10c and driven at a much higher speed than the rollers 10c of the conveyor 10 so that a row of articles 16a (or an individual article) delivered onto the second conveyor 12 will be swiftly moved out of the way before the next row of articles 16b (or individual article) from which it was separated is moved onto the second conveyor. If it were desired to separate the articles 18 in each row 16a or 16b thereof, the second conveyor 12 would include an elevated separator roller like the roller 20.

In accordance with the invention, as best shown in FIGS. 2, 3 and 4, a vertically movable article support unit 30 is positioned at the inlet station 12a of the conveyor 12, adjacent to the discharge station 10b of the conveyor 10. In the embodiment of the invention illustrated, the article support unit 30 includes a pair of spaced, substantially parallel channel members 32—32 having narrow, upper, horizontal flanges 32a to the upper surfaces of which are secured a plurality of spaced, elongated, elevator angle members 34. Each angle member 34, as illustrated, has a vertical leg portion 34a extending between and anchored to the channel members 32—32 and a horizontally disposed, article supporting leg portion 34b positioned and sized to pass between the rollers 12b at the inlet station 12a of the second conveyor 12. As best shown in FIG. 4, the upper surface of each article supporting leg portion 34b is preferably provided with a thin layer, film or coating 36 of a low friction material such as a plastic material, exemplified by a high density polyethylene or polypropylene, to enable articles to easily slide thereon.

The article support unit 30 is mounted for up and down movement so the article supporting leg portions are movable between a lowered position (FIG. 3) below the support plane of the rollers 12b to a position above the level of the support plane thereof (FIG 2). Vertical movement of the article supporting leg portions 34b may be achieved, in part, by securing an end portion of a pair of lever bars 38—38 to the ends of the channel members 32—32 of the article support unit 30 and pivotably mounting, as at 40, the unsecured ends of the lever bars 38—38 to downwardly extending lugs or ears 42—42 fastened to the underframe of the conveyor 10. Movement of the article support unit 30 about the pivot 40 may be attained by positioning a rotatable rod 44 below the support arms 32—32. As shown, the ends of the rod 44 are journalled in openings provided in a pair of channel members 46—46 secured to the underframe of the conveyor 12. The rod 44 has a pair of spaced lifters or lugs 48—48 secured to rod 44 inwardly of the ends thereof. The lifters or lugs 48—48 act to engage the lower leg portion 32b of one of the members 32—32 when the rod 44 is rotated.

Rotation of the rod 44 may be attained by keying one end of a link bar 50 to the center of the rod 44. The other end of the link bar 40 is pivotally connected as at 52 to an air cylinder 54 through a piston rod 56 and a piston rod head 56a. The air cylinder 54 is secured to a bracket 58 which may be anchored to a vertical support leg 60 connected to the underframe of the conveyor 10. The air cylinder 54 advantageously is of the conventional type having a valve assembly (not shown) which is operated by a solenoid 62 (see FIG. 5) which when energized effects extension of the rod 56 and when de-energized effects retraction of the rod 56. The rate at which the article support unit 30 is moved upwardly and downwardly can be controlled by regulation of the valves comprising the valve assembly of the air cylinder 54.

Automatic operation of the air cylinder 54 is initiated by providing an article position sensing means, like a light source 66 on one side of the first conveyor 10 at the discharge station 10b thereof. The source 66 projects a beam 66a of light, parallel to the longitudinal axis of the separator roller 20 to a light receiver 68 (See FIG. 1). The light receiver 68 effects closure of a contact 70 (FIG. 5) in series with a solenoid 62 associated with the air cylinder 54 to effect the raising of the article support unit 30 as long as the light beam remains interrupted.

An abutment wall 72 is positioned on the framework of the conveyor 12, on the side thereof opposite to the inlet station 12a, to stop the forward movement of an article which is propelled onto the article support member 30 by the separator roller 20, and to aid in the proper orientation of the articles 18 before they are moved along the conveyor 12 by the rollers 12b, should they be slightly out of alignment. The abutment wall 72 could not be effective in orienting the articles if they are substantially misoriented or twisted when contacting the same.

In the operation of the system of the resent invention, articles 18 placed on the conveyor 10 in abutting rows 16a and 16b as illustrated (or otherwise) are moved along by the conveyor 10 by the driven rollers 10c in this condition until the leading ends 18a of a row 16a of the articles 18 makes contact with the high speed separator roller 20. The light beam 66a from the light source 66 is then interrupted and the solenoid 62 is energized causing the valve assembly associated with the air cylinder 54 to exert an outward pressure on the piston of the air cylinder 54. The piston rod 56 and the piston head 56a of the cylinder 54 are then driven outwardly to effect pivoting of the link bar 50 and simultaneous raising of the article supporting leg portions 34b of the article support unit 30 above the support plane of the driven rollers 12b of the second conveyor 12 (See FIG. 4) so the articles discharged from the first conveyor 10 by the separator roller 20 are spaced above the rollers 12b of the second conveyor 12. The articles 18 involved slide on the low friction surface 36 of the article supporting leg portion 34b and strike the abutment wall 72 which acts to halt the forward movement of the articles 18 and to properly orient them with relation to the path of travel of the articles along the conveyor 12. As the row 16a of articles involved leave the light beam 66a, the solenoid 62 is de-energized and the article support unit 30 is lowered at a speed such that articles 18 do not touch the rollers 12b until they have come to rest against the abutment wall 72. The articles are speedily moved from the inlet station 12a by the rollers 12b before the next row 16b of articles 18 reaches the separator roller 20 and the light beam 66a, to cause a repeat of the system operation just described.

Various modifications and changes can, of course, be made in the preferred embodiment of the invention described above without departing from the broader aspects thereof. Thus, for example, skate rollers can be used instead of the angle members 34 to provide a low friction support surface for the articles propelled onto the article supporting unit 30 by the separator roller 20. Also, where the articles 18 are initially widely separated, an article separation operation is not required, and the separator roller 20 could be omitted. In such case, the speed at which the articles are discharged from the first conveyor 10 desirably should be sufficient to impel the articles against the abutment wall 72 (if the abutment wall is needed or desirable).

What is claimed is:

1. A conveyor system for changing the direction of travel of a moving article from a first horizontal direction of travel to a second horizontal direction of travel which is at a substantial angle to the first direction of travel while properly maintaining a given article orientation, said system comprising: first continuously driven conveyor means for moving an article along a given path to a discharge station where the article is propelled therefrom in said first direction of travel; second continuously driven conveyor means having an inlet station positioned at said discharge station of said first conveyor means to receive an article therefrom and to move the same in said second direction of travel; vertically movable support means movable between a lowered position below the level of said second conveyor means at said inlet station thereof and an elevated position above the level thereof where it receives the article propelled from said discharge station of said first conveyor means and supports the same above said inlet station until it comes to rest; control means for moving said vertically movable support means to an elevated position as an article is propelled from said discharge station of said first conveyor means and for then moving the support means to said lowered position where the article is supported by said second conveyor means and is thereupon conveyed in said second direction of travel, said vertically movable support means having top support surface means which have no substantial horizontal component of motion at least when it is lowered to the point where an article thereon becomes supported by said second conveyor means, another being provided at the discharge station of said first conveyor means article impelling means moving at a higher speed than said first conveyor means for impelling articles leaving said discharge station upon said elevated vertically movable support means and against said abutment wall means.

2. The conveyor system of claim 1 wherein said first conveyor means receives articles which are in front to back abutment or so closely spaced that substantial separation thereof is desired when the articles are discharged upon said second conveyor means, said article impelling means at the discharge station of said first conveyor means effecting the substantial separation of such articles, and said second conveyor means operating at a linear speed substantially greater than the linear speed of said first conveyor means so an article discharged upon the inlet station of said second conveyor means is moved out of the path of travel of the article immediately therebehind from which it has been separated by said article impelling means.

3. A conveyor system for changing the direction of travel of a moving article from a first horizontal direction of travel to a second horizontal direction of travel which is at a substantial angle to the first direction of travel while properly maintaining a given article orientation, said system comprising: first continuously driven conveyor means for moving an article along a given path to a discharge station where the article is propelled therefrom in said first direction of travel; second continuously driven conveyor means having an inlet station positioned at said discharge station of said first conveyor means to receive an article therefrom and to move the same in said second direction of travel; vertically movable support means movable between a lowered position below the level of said second conveyor means at said inlet station thereof and an elevated position above the level thereof where it receives the article propelled from said discharge station of said first conveyor means and supports the same above said inlet station until it comes to rest; control means for moving said vertically movable support means to an elevated position as an article is propelled from said discharge station of said first conveyor means and for then moving the support means to said lowered position where the article is supported by said second conveyor means and is thereupon conveyed in said second direction of travel, said vertically movable support means having top support surface means which have no substantial horizontal component of motion at least when it is lowered to the point where an article thereon becomes supported by said second conveyor means; the articles carried by said first conveyor means being in front to back contact or are so closely spaced that it is desired to further separate the same when the articles are delivered to said second conveyor means article impelling and separating means at the discharge station of said first conveyor means which means operate at a linear speed greater than the first conveyor means said article impelling and separator means being at an elevation somewhat above that of said first conveyor means so that an article contacting the same is raised above the level of said first conveyor means except for the rear end thereof which continues momentarily to engage said first conveyor means, said first conveyor means at least immediately behind said article impelling and separator means comprises longitudinally spaced roller means all of which are continuously driven roller means except the roller means engaged by the rear end of the articles as the leading end thereof is raised by said article impelling and separator means which latter roller means is an undriven idler roller means, said article impelling and separator means when engaging the leading end of an article frictionally impelling the article onto the elevated vertical movable support means without causing the article to contact the intervening driven roller means of said first conveyor means.

4. A conveyor system for changing the direction of travel of a moving article from a first horizontal direction of travel to a second horizontal direction of travel which is at a substantial angle to the first direction of travel while properly maintaining a given article orientation, said system comprising: first continuously driven conveyor means for moving an article along a given path to a discharge station where the article is propelled therefrom in said first direction of travel; second continuously driven conveyor means having an inlet station positioned at said discharge station of said first conveyor means to receive an article therefrom and to move the same in said second direction of travel; vertically movable support means movable between a lowered position below the level of said second conveyor means at said inlet station thereof and an elevated position above the level thereof where it receives the article propelled from said discharge station of said first conveyor means and supports the same above said inlet station until it comes to rest; control means for moving said vertically movable support means to an elevated position as an article is propelled from said discharge station of said first conveyor means and for then moving the support means to said lowered position where the article is supported by said second conveyor means and is thereupon conveyed in said second direction of travel, said vertically movable support means having top support surface means which have no substantial horizontal component of motion at least when it is lowered to the point where an article thereon becomes supported by said second conveyor means; and article impelling means at the discharge station of said first conveyor means which means operates at a linear speed greater than the first conveyor means, said article impelling means being at an elevation somewhat above that of said first conveyor means so that an article contacting the same is raised above the level of said first conveyor means except for the rear end thereof which continues momentarily to engage said first conveyor means, said first conveyor means at least immediately behind said article impelling means comprises longituribally spaced roller means all of which are continuously driven roller means except the roller means engaged by the rear end of the article as the leading end thereof is raised by said article impelling means which latter roller means is an undriven idler roller means, said article impelling means when engaging the leading end of an article frictionally impelling the article onto the elevated vertical movable support means without causing the article to contact the intervening driven roller means of said first conveyor means.

5. Conveyor apparatus comprising: a roller conveyor section having longitudinally spaced roller means delivering articles to a discharge point, speed-up article impelling means at said discharge point positioned slight above the elevation of the roller means therebehind so as an article reaches the speed-up article impelling means the article is raised above the level of the preceding roller means of the conveyor section except for the rear end thereof, and means for continuously driving the roller means of said conveyor section leading up to said slightly elevated speed-up article impelling means except for the roller means engaged by the rear end of the article or the leading end thereof is raised by said article speed-up and impelling means, the latter roller means being an undriven idler roller means, said article impelling means when engaging the leading end of an article frictionally impelling the article forward without causing the article to contact the intervening driven roller means.

* * * * *